United States Patent [19]

Loire

[11] 4,446,806
[45] May 8, 1984

[54] SINGLE POINT MOORING AND FENDER

[75] Inventor: René Loire, Houston, Tex.

[73] Assignee: Morrison-Knudsen Company, Inc., Boise, Id.

[21] Appl. No.: 363,408

[22] Filed: Mar. 30, 1982

Related U.S. Application Data

[63] Continuation of Ser. No. 146,606, May 5, 1980.

[51] Int. Cl.³ .............................................. E02B 3/22
[52] U.S. Cl. ................................. 114/219; 114/230; 405/212
[58] Field of Search ............... 114/219, 230; 405/211, 405/212, 216; 441/3

[56] References Cited

U.S. PATENT DOCUMENTS

| | | | |
|---|---|---|---|
| 2,120,545 | 6/1938 | Buckton | 114/219 |
| 2,915,879 | 12/1959 | Besse | 405/212 |
| 3,008,599 | 11/1961 | Young, Jr. | 220/1 |
| 3,041,639 | 7/1962 | Atlas | 114/230 |
| 3,237,587 | 3/1966 | Ross | 114/230 |
| 3,426,542 | 2/1969 | Hindman et al. | 114/219 |
| 3,457,729 | 7/1969 | Wanneroy | 114/219 |
| 3,462,960 | 8/1969 | Bruehl | 114/219 |
| 3,464,214 | 9/1969 | King | 114/219 |
| 3,522,787 | 8/1970 | Tam | 114/230 |
| 3,570,257 | 3/1971 | Walker et al. | 114/219 |
| 3,630,035 | 12/1971 | Wanneroy | 114/219 X |
| 3,675,610 | 7/1972 | Kohring | 114/219 X |
| 3,783,816 | 1/1974 | Chassy | 114/230 |
| 3,842,779 | 10/1974 | Jaynes | 114/230 |
| 3,901,040 | 8/1975 | Sandberg | 114/219 |
| 3,938,462 | 2/1976 | Brandt | 14/230 |
| 4,098,211 | 7/1978 | Files et al. | 114/219 |
| 4,135,467 | 1/1979 | Loire et al. | 114/219 |
| 4,254,522 | 3/1981 | van Heijst | 441/3 |

Primary Examiner—Sherman D. Basinger
Attorney, Agent, or Firm—Buell, Blenko, Ziesenheim & Beck

[57] ABSTRACT

The specification discloses a single point mooring and fender suitable for large ocean going vessels. A dolphin is surrounded by a ring which is connected to the dolphin by a plurality of extensible resilient members adapted to absorb the kinetic energy of a hull moving against the fender.

7 Claims, 4 Drawing Figures

SINGLE POINT MOORING AND FENDER

This application is a continuation of application Ser. No. 146,606, filed May 5, 1980.

This invention relates to fenders for single point moorings for ships. More particularly, the invention relates to fenders for use with a single vertical dolphin to which a ship may be moored.

The increasing use of large tankers such as very large crude carriers and ultra large crude carriers has made use of piers and many existing harbors and channels impractical. It has become increasingly common to moor such vessels in deep water at a single point mooring around which the ship may swing under influence of wind and current. The ship is moored by approaching the mooring and tying on. Hoses may then be connected up for transfer of product to or from the ship. Single point moorings, for example, may be in the form of a tower constructed of piling or a tubular dolphin.

It is desired to provide fenders adjacent the single poing mooring to protect the hoses and fittings from being crushed between the ship and the mooring and also to absorb energy should the ship approach the dolphin too closely. Various types of fenders have heretofore been proposed. In one design a circular ring is provided surrounding the dolphin and an elastomeric material is interposed between them. Energy is absorbed by deformation of the elastomer. The design is very large and heavy. The size makes it a larger target for the ship, the weight makes it more difficult for the fender to swing freely with the ship. In another design a circular tube is mounted upon steel spokes in a bicycle wheel arrangement. A problem is that under heavy loads the spokes will be deformed or broken and must be replaced. The replacement of the consumable spokes is a drawback and places the mooring out of service during the time of repair. Also, the size of a wheel required to produce a spoke of sufficient length to provide sufficient deformation before failure produces a large target.

I provide fender means associated with a single point mooring. I provide a tubular means surrounding the mooring point and attached to the mooring point by resilient means. I prefer to provide a floating tubular member which floats on the water surrounding a dolphin or the like. I further prefer to extend a plurality of resilient members between the dolphin or the like and the floating tubular member. In one form of the invention I provide sleeve means surrounding a tubular dolphin and attach the resilient means thereto.

In a present preferred embodiment of the invention I provide a tubular dolphin, sleeve means surrounding the dolphin, tubular frame means surrounding the dolphin, and at least three resilient means in the form of nylon hawsers extending between the sleeve means and the frame means. In my present preferred embodiment, the frame means are formed of hollow round tubing and are triangular in plan.

In the accompanying drawings I have illustrated the present preferred embodiment of my invention in which.

Figure 1:
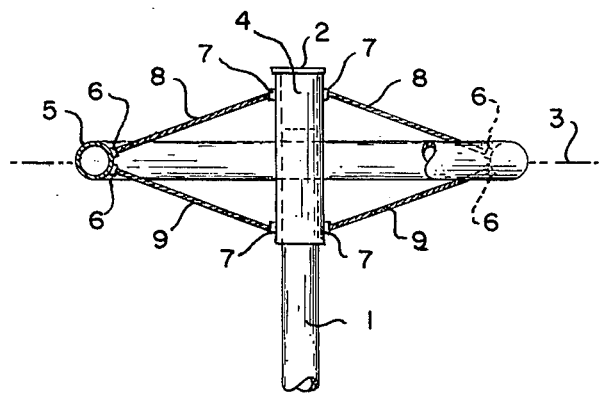
FIG. 1 is a side elevational view of a tubular dolphin equipped with a fender embodying my invention.
Figure 3:
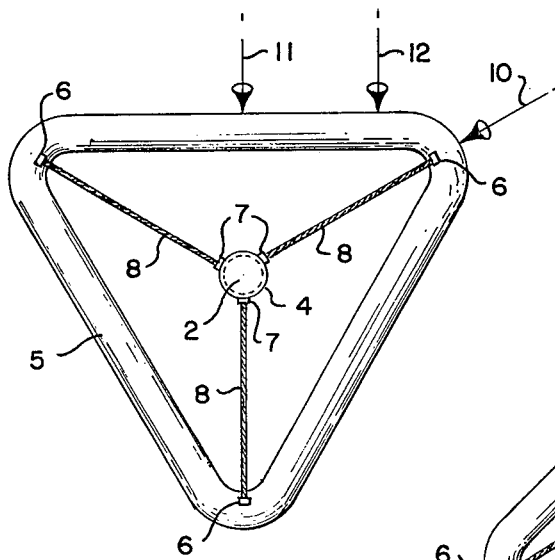
FIG. 3 is a plan view of the apparatus shown in each of FIG. 1.

FIG. 1 shows a tubular dolphin 1 which may be a driven pile or which may be attached to some sort of undersea structure resting on the bottom of a harbor. The top of the dolphin 2 projects above the water line 3. A sleeve 4 is rotatably mounted upon dolphin 1. A fender 5 is formed of round tubing and is buoyant which causes it to float upon the surface of the water. In plan (FIG. 3) fender 5 is triangular in shape and surrounds dolphin 2 like a ring. Two pads 6 with eyes are welded to the inside of fender 5 at each of the three corners. Three pairs of pads 7 are welded to sleeve 4 at equal intervals around sleeve 4. One pad of each pair is welded near the top of the sleeve and the other pad of the same pair is welded near the bottom of the sleeve. Three nylon hawsers 8 extend between upper pads 6 and upper pads 7. Three more nylon hawsers 9 extend between lower pads 6 and lower pads 7.

Figure 2:
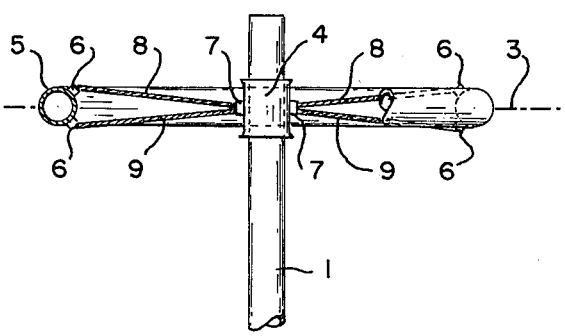
FIG. 2 is a side elevational view of a dolphin similar to that in FIG. 1, but with a modified form of resilient means.

An alternate form of the invention is shown in FIG. 2. Like numbers are used to denote like parts. A difference between the structure of FIG. 2 and that of FIG. 1 is that a shorter sleeve 4 is provided; three pads 7 are welded to sleeve 4 at equal intervals around the sleeve. Each pair of hawsers 8 and 9 terminates at a single pad 7 instead of at upper and lower spaced apart pads.

In operation fender 5 will float on the surface of the water 3 and will support sleeve 4 whose weight is carried by hawsers 8 and 9 from dolphin 1. Fender 5 and sleeve 4 are thereby free to fall and to rise on dolphin 1 along with falling and rising tides.

The action of the fender under load imposed by a ship's hull coming too close to dolphin 1 may be analyzed by considering three possible cases. In one case an impact delivered by a ship's hull may be considered as coming along line 10 and striking one point of fender 5 in alignment with a pair of hawsers 8 and 9. In that situation the four hawsers opposite the point of impact will be stretched by the applied force. As the deflection increases the resistance of the hawsers to further stretching will increase; thus increased deflection causes increased resistance and acts to bring the ship to a stop over a significant distance. This case is unlikely in view of geometry of the structure.

Nylon hawsers have the property of substantial elongation without rupture. For example, an elongation in the order of 30% may be expected at about 70% of breaking strength. Putting aside a permanent elongation, which takes place at the time of first pulling, the hawser may be expected to recover substantially its original length upon relaxation of the load.

A second case occurs when impact is along line 11 striking fender 5 mid-way between two points of the triangle and with the force aligned with one pair of hawsers directly opposite. In that case the entire load is carried by one pair of hawsers 8 and 9. Additionally, some bending of frame 5 will take place. Thus, the absorption of energy occurs over a greater distance than in the first case. Since the load is carried by two hawsers instead of four a greater deflection will take place for the same load. The second case is also unlikely.

Figure 4:
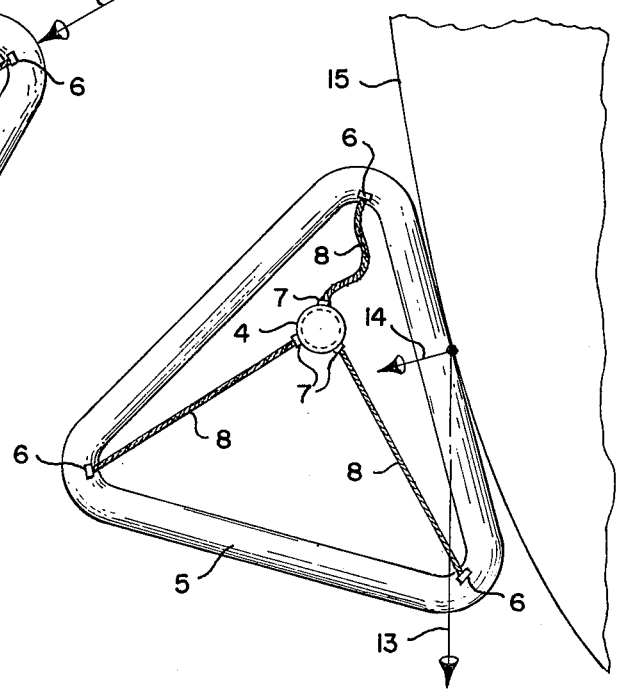
FIG. 4 is a plan view like that in FIG. 3 showing a portion of the hull of a ship which is bearing against the fender.

The most likely case is when impact takes place along one flat side of fender 5 in such a location as to cause fender 5 to revolve. Such an impact is shown by arrow 12. In such a case the frame will rotate and assume a position as shown in FIG. 4. After frame 5 has rotated and reached the position of FIG. 4 the impact force of a hull 15 may be resolved into two components shown by arrows 13 and 14. One pair of hawsers will go slack as shown in FIG. 4 and the other two pairs of hawsers will be elongated according to the relative values of forces represented by arrows 13 and 14. Also, energy will be dissipated by frictional engagement between the hull 15 of the ship and frame 5.

In the embodiment shown in FIG. 1 fender 5 will tend to stay in the plane of the water surface when a load is applied laterally to it. In the embodiment of FIG. 2, however, some tilting may take place as a load is applied as shown in FIG. 4.

While I have illustrated and described certain present preferred embodiments of my invention, it is to be understood that I do not limit myself thereto and that my invention may be otherwise variously practiced within the scope of the following claims.

I claim:

1. A single point mooring comprising a dolphin and the like fixed in the ocean bottom, a plurality of rigid fender segments joined end to end and forming an endless member positioned in a horizontal plane surrounding the dolphin, a plurality of flexible yielding means, each having one end connected to the dolphin and the other end connected to the endless member, said flexible yielding means being connected to the endless member at vertices formed by said segments whereby contact between the endless member and the dolphin is resisted by at least one of the flexible yielding means.

2. A mooring as set forth in claim 1 in which the endless member comprises a tubular buoyant structure.

3. A single point mooring comprising a dolphin and the like fixed in the ocean bottom, an endless impact member consisting essentially of a plurality of buoyant segments joined end to end, said impact member floating on the surface of the ocean surrounding the dolphin, a plurality of flexible yielding means extending between the dolphin and the impact member, each flexible yielding means having one end connected to the dolphin and the other end connected to the impact member, said flexible yielding means being connected to the impact member at vertices formed by said segments whereby contact between the impact member and the dolphin is resisted by at least one of the flexible yielding means.

4. The mooring means of claim 3 in which the impact member comprises a tubular member having a plurality of straight segments.

5. The mooring means of claim 4 in which the flexible yielding means extend radially from the dolphin on at least three different axes.

6. The single point mooring of claim 4 in which the endless impact member is substantially triangular in plan.

7. A single point mooring comprising a dolphin and the like fixed in the ocean and projecting through the surface of a body of water, sleeve means rotatably mounted on the dolphin for free movement vertically and rotationally, a plurality of rigid fender segments joined end to end and forming and endless floating member surrounding said sleeve means and said dolphin, a plurality of flexible yielding means, each having one end connected to the sleeve means and the other end connected to the endless member, said flexible yielding means being connected to the endless member at vertices formed by said segments whereby contact between the endless member and the dolphin and sleeve is resisted by at least one of the flexible yielding means.

* * * * *

UNITED STATES PATENT AND TRADEMARK OFFICE
CERTIFICATE OF CORRECTION

PATENT NO. : 4,446,806
DATED : May 8, 1984
INVENTOR(S) : Rene Loire

It is certified that error appears in the above-identified patent and that said Letters Patent is hereby corrected as shown below:

On the title page:

In the References, Patent 3,675,610, change "7/1972" to --3/1971--

In the References, Patent 3,938,462, change "14/230" to --114/230--

Column 1, line 22, change "poing" to --point--

Signed and Sealed this

Second Day of October 198

[SEAL]

Attest:

Attesting Officer

GERALD J. MOSSINGHOFF

Commissioner of Patents and Trademarks